(12) United States Patent
Michel et al.

(10) Patent No.: US 9,466,329 B1
(45) Date of Patent: Oct. 11, 2016

(54) METHODS OF MODULATING DATA FREQUENCY

(71) Applicant: Seagate Technology LLC, Cupertino, CA (US)

(72) Inventors: Richard P. Michel, Minneapolis, MN (US); Ray V. Rigles, Bloomington, MN (US); Tong Shirh Stone, Eden Prairie, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 14/852,503

(22) Filed: Sep. 12, 2015

(51) Int. Cl.
G11B 5/02 (2006.01)
G11B 27/36 (2006.01)
G11B 20/10 (2006.01)

(52) U.S. Cl.
CPC .............. G11B 20/10305 (2013.01)

(58) Field of Classification Search
CPC ..... G11B 20/1217; G11B 5/09; G11B 27/36; G11B 5/012; G11B 5/6005; G11B 5/59633; G11B 5/59627; G11B 5/5961; G11B 20/1258; G11B 5/02; G11B 5/59688; G11B 2220/20
USPC ...... 360/48, 55, 75, 53, 77.02, 31, 78.04, 29
See application file for complete search history.

(56) References Cited

U.S. PATENT DOCUMENTS

| | | | |
|---|---|---|---|
| 5,825,578 A | 10/1998 | Shrinkle et al. | |
| 6,035,351 A | 3/2000 | Billings et al. | |
| 6,765,737 B1 | 7/2004 | Lim et al. | |
| 6,940,679 B1 | 9/2005 | McNeil et al. | |
| 7,046,471 B2 | 5/2006 | Meyer et al. | |
| 7,317,587 B2 | 1/2008 | Furuhashi et al. | |
| 7,392,439 B2* | 6/2008 | Seng | G11B 20/18 714/704 |
| 7,418,531 B2 | 8/2008 | Brewer et al. | |
| 7,705,588 B2 | 4/2010 | Eaton et al. | |
| 7,916,421 B1 | 3/2011 | Liikanen et al. | |
| 8,102,613 B2 | 1/2012 | Duan et al. | |
| 8,325,434 B2 | 12/2012 | Namkoong et al. | |
| 8,395,857 B2* | 3/2013 | Zhang | G11B 5/455 360/31 |
| 8,736,995 B1 | 5/2014 | Wiesen et al. | |
| 8,755,142 B2 | 6/2014 | Grobis et al. | |
| 9,070,376 B2* | 6/2015 | Eto | G11B 20/24 |
| 9,082,458 B1* | 7/2015 | Tang | G11B 20/1258 |
| 9,099,135 B1 | 8/2015 | Bao et al. | |
| 9,111,578 B1* | 8/2015 | Hassel | G11B 20/1217 |
| 2013/0238834 A1 | 9/2013 | Feldman et al. | |
| 2013/0342931 A1 | 12/2013 | Grobis et al. | |

OTHER PUBLICATIONS

U.S. Appl. No. 14/676,742, filed Apr. 1, 2015, Wiesen et al.

* cited by examiner

*Primary Examiner* — Nabil Hindi
(74) *Attorney, Agent, or Firm* — Mueting, Raasch & Gebhardt, P.A.

(57) ABSTRACT

Methods for determining a variable data frequency for recording data on a zone of a magnetic storage disc, each zone including a plurality of tracks and each track including a plurality of sectors, the method includes measuring a signal to noise ratio (S/N) around at least a first track in a first zone; and modulating a data frequency based on the measured S/N around the first track.

20 Claims, 6 Drawing Sheets

METHODS OF MODULATING DATA FREQUENCY

SUMMARY

Disclosed are methods for determining a variable data frequency for recording data on a zone of a magnetic storage disc, each zone including a plurality of tracks and each track including a plurality of sectors, the method includes measuring a signal to noise ratio (S/N) around at least a first track in a first zone; and modulating a data frequency based on the measured S/N around the first track.

Also disclosed are disc drives that include at least one magnetic storage disc, each of the at least one magnetic storage discs including a plurality of zones, each zone including a plurality of tracks, and each track including a plurality of sectors; at least one associated magnetic data transducer; a write channel adapted to write data to the magnetic storage disc at a variable data frequency, which may differ for different sectors within each zone of the magnetic storage disc; and a read channel adapted to read data from the magnetic storage disc at a variable data frequency, which may differ for different sectors within each zone of the magnetic storage disc, the variable data frequency being dependent on a signal to noise ratio (S/N) of at least some portion of the magnetic storage disc.

Also disclosed are methods for recording data on and writing data to a zone of a magnetic storage disc, each zone including a plurality of tracks and each track including a plurality of sectors, the method includes measuring a signal to noise ratio (S/N) in at least each sector around at least a first track in a first zone; determining how the S/N changes around the tracks in the first zone by mathematically fitting the measured S/N to an equation; and recording data on or writing data to the zone of the magnetic storage disc by modulating a data frequency for recording data or writing data based on the equation.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Although there are constant advancements in magnetic discs and magnetic disc drives, there still remains variability, and in some instances significant variability, in the bit error ratio. The bit error ratio is the number of errors divided by the total number of bits. This variability in bit error ratio remains even after variable bit aspect ratio (VBAR) adjustments are made to the bits per inch (BPI), tracks per inch (TPI), and clearance. Therefore, other methods of adjusting for the variability in bit error ratio are necessary. Disclosed herein are methods of determining a recording frequency for recording data on a magnetic storage disc.

Figure 1:
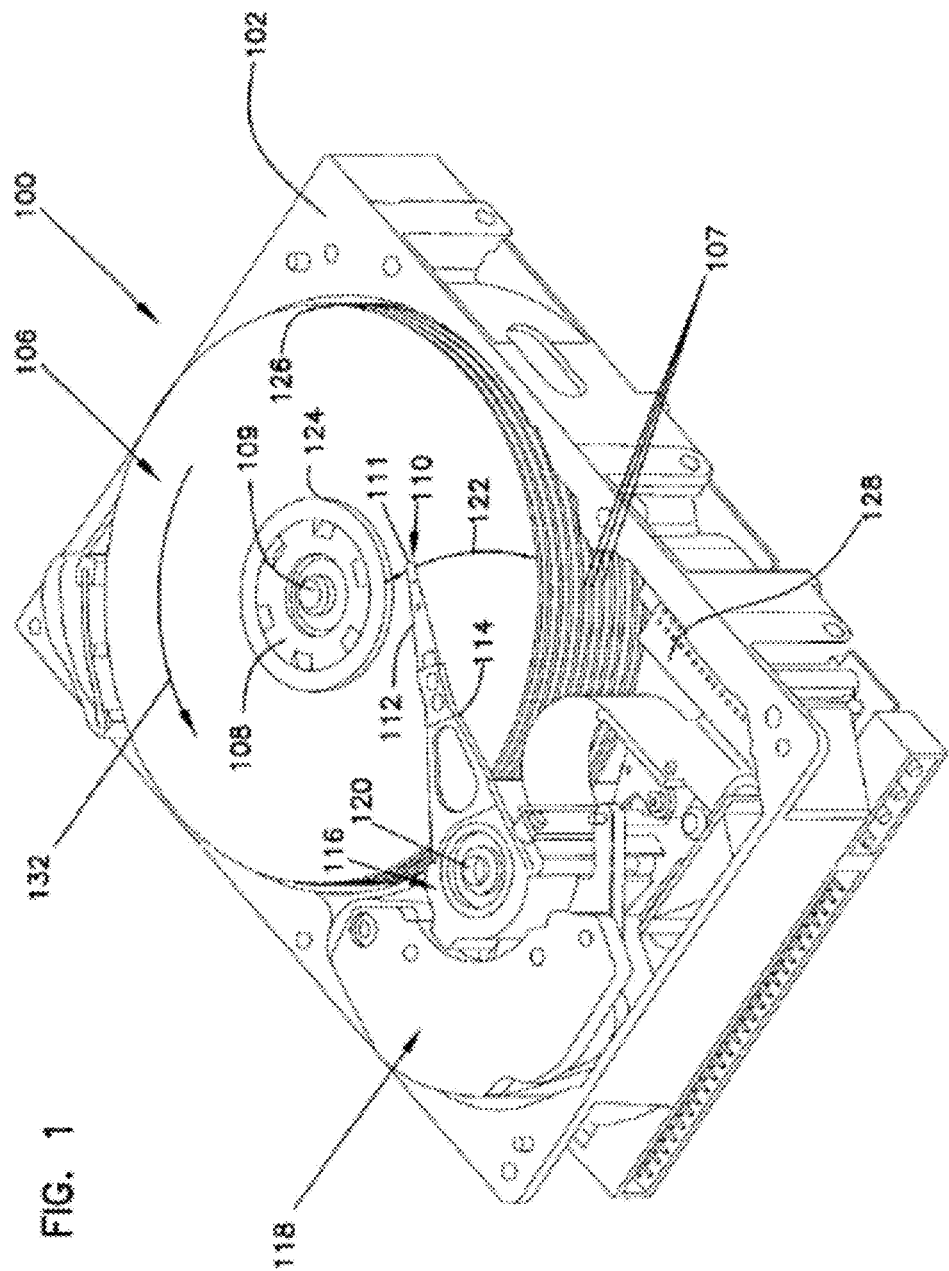
FIG. 1 is a perspective view of a disc drive in which aspects of the present invention may be practiced.

FIG. 1 is a perspective view of an illustrative disc drive 100 in which the present disclosure may be useful. Disc drive 100 includes a housing with a base 102 and a top cover (not shown). Disc drive 100 further includes a disc pack 106, which is mounted on a spindle motor (not shown) by a disc clamp 108 for rotation in the direction of arrow 132. Disc pack 106 includes a plurality of individual magnetic recording discs 107, which are mounted for co-rotation about central axis 109. Each disc surface has an associated slider 110 that is mounted in disc drive 100 for communication with the confronting disc surface. Slider 110 is arranged to fly above the associated disc surface of an individual disc of disc pack 106, and carries a transducing head 111 arranged to write data to, and read data from, concentric tracks on the confronting disc surface. In the example shown in FIG. 1, sliders 110 are supported by suspensions 112 which are in turn attached to track accessing arms 114 of an actuator 116. Actuator 116 is driven by a voice coil motor (VCM) 118 to rotate the actuator, and its attached sliders 110, about a pivot shaft 120. Rotation of actuator 116 moves the heads along an arcuate path 122 to position the heads over a desired data track between a disc inner diameter 124 and a disc outer diameter 126.

Voice coil motor 118 is operated by position signals from servo electronics included on circuit board 128, which in turn are based on error signals generated by heads 111 and position signals from a host computer (not shown). Read and write electronics are also included on circuit board 128 to supply signals to the host computer based on data read from disc pack 106 by the read portions of heads 111, and to supply write signals to the write portions of heads 111 to write data to the discs. The electronics (e.g., functional circuit) that are designed to write data to the magnetic storage disc can be referred to collectively as the "write channel" and the electronics (e.g., functional circuit) that are designed to read data from the magnetic storage disc can be referred to collectively as the "read channel".

Figure 2:
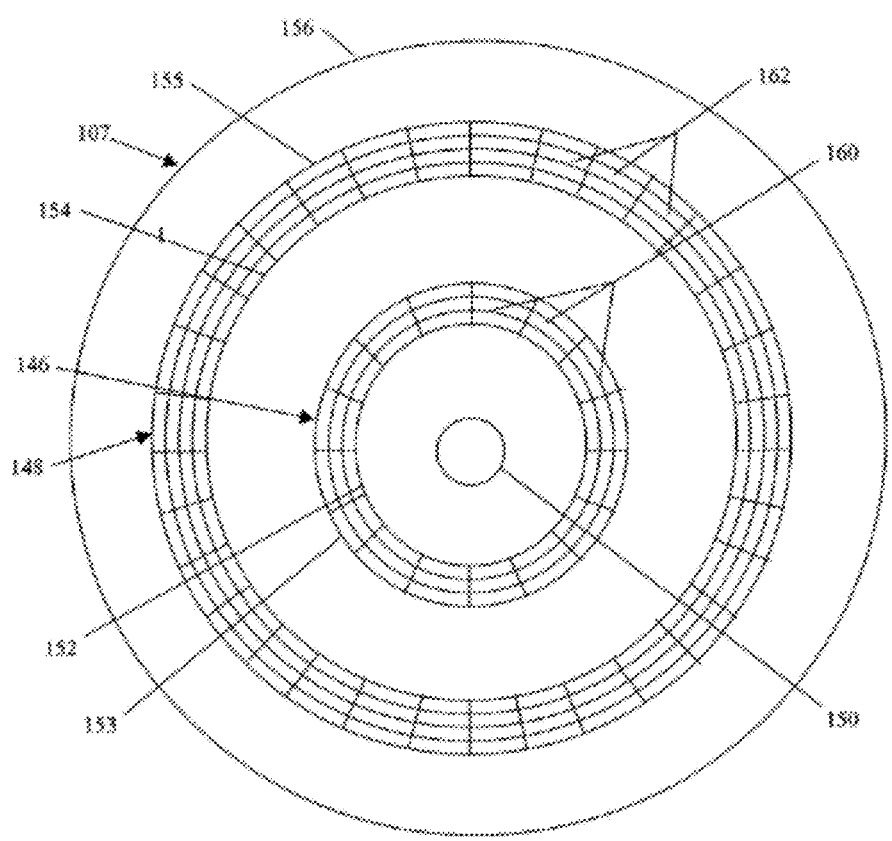
FIG. 2 is a plan view of a disc medium for the disc drive illustrated in FIG. 1 illustrating a layout of zones and sectors of a disc.

FIG. 2 illustrates the layout of a recording surface of a typical magnetic recording disc 107 to which the present disclosure may be applied. The recording surface includes a plurality of concentric tracks 150-156, with track 150 at an inner radius and track 156 at an outer radius of disc 107. The length of track 156 may be significantly greater than that of track 150. The tracks can be segmented into a plurality of zones 146, 148, each containing a plurality of tracks. Thus, zone 146 contains tracks 152 . . . 153 and zone 148 contains tracks 154 . . . 155.

Each track in each zone can be further segmented into a plurality of sectors such that the number of sectors is the same for all tracks in a given zone. Thus, each track 152 . . . 153 in zone 146 contains a selected number of sectors 160 and each track 154 . . . 155 in zone 148 may contain a different selected number of sectors 162. Each sector 160, 162 may contain the same number of bits.

Figure 3:
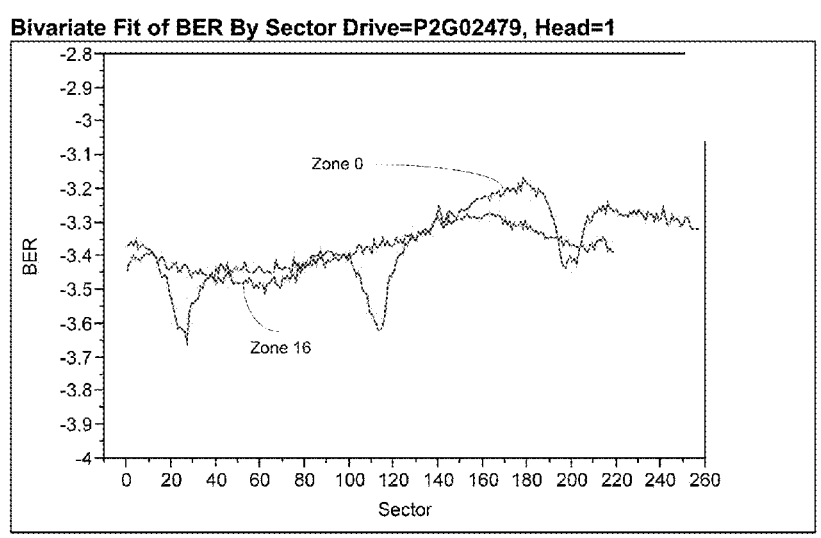
FIG. 3 shows bit error rate (BER) measurements versus sector at zone 0 and zone 16 of a magnetic storage disc.

As mentioned above, the bit error ratio of a magnetic storage disc is typically not constant. FIG. 3 illustrates this point, by showing the bit error ratio (BER) for one particular magnetic head of a magnetic storage disc drive of zone 0 and zone 16 of the magnetic storage disc. As seen from this graph, the BER varies greatly from one sector to another and can vary differently for different zones.

Methods disclosed herein include the measurement of a signal to noise ratio at one or more points on one or more tracks. The measured signal to noise ratio is then utilized to modulate the frequency at which data is recorded on the one or more tracks.

In some embodiments, the signal to noise ratio (also referred to as "S/N") can be measured around an entire track. Such a measurement can be referred to as a once around (also referred to as "OAR") measurement. In some embodiments, the S/N can be measured OAR for each track on a magnetic storage disc, OAR for one track in each zone, OAR for one or more tracks in each zone, or any combination thereof. In some embodiments, the S/N can be measured enough times or at enough tracks on a magnetic storage disc or at enough tracks in a zone so that time dependent noise is at least substantially eliminated, or in some embodiments so that only repeatable variation is noted in the S/N measurements. In some embodiments, the S/N can be measured OAR on one track in each zone of a magnetic storage disc.

In some embodiments, the S/N measurement can include measurement of the bit error rate. The bit error rate can be described by the number of bit errors per unit time. In some embodiments, the S/N measurement can include measurement of the bit error ratio. The bit error ratio can be described as the number of bit errors divided by the total number of transferred bits during a studied time interval. Either the bit error rate or the bit error ratio can be utilized or measured as one way of measuring the S/N of a track. In some embodiments, the S/N measurement can actually be a measurement of the signal to noise without any additional processing (additional processing of the signal to noise results in the bit error rate or bit error ratio).

As discussed above, data can be written to a magnetic storage disc using a write channel and data can be read from a magnetic storage disc using a read channel. The frequency at which the data is read from and written to the magnetic storage disc as the head is traveling around the disc can be referred to as a data frequency. This frequency is the same whether the data is being read from or written to the magnetic storage disc. Previously, in magnetic storage systems the data frequency was constant around a track, and in most systems the data frequency was the same for every track in a zone. The more the data frequency is changed, the more the data reading and writing system slows down. In disclosed methods and magnetic storage systems (e.g., magnetic disc drives) the data frequency is not constant around a single track, but is instead modified.

Once the S/N has been measured, the variability in the S/N can be utilized to modulate the data frequency. For example, at instances where the S/N measurement is higher (e.g., less noise), the data frequency can be increased and at instances where the S/N measurement is lower (e.g., more noise) the data frequency can be decreased. Higher data frequencies produced more noise and lower data frequencies produce less noise. In some embodiments therefore, the data frequency can be changed by an amount, e.g. A, to account for the level of noise (as measured by the S/N measurement) in an effort to make the S/N more uniform across the entire magnetic storage disc.

In some embodiments, the S/N measurement can be mathematically modeled to determine a "best fit" for the S/N measurement. The mathematical best fit of the S/N measurement can then be utilized to alter the data frequency accordingly, e.g., an equation that best describes how the S/N changes can be utilized to change the data frequency. In some embodiments, a S/N measurement OAR a track can be mathematically manipulated to find an equation that describes the S/N measurement OAR the track and that equation can be utilized to modulate the data frequency for reading and writing around the track.

Figure 4A:
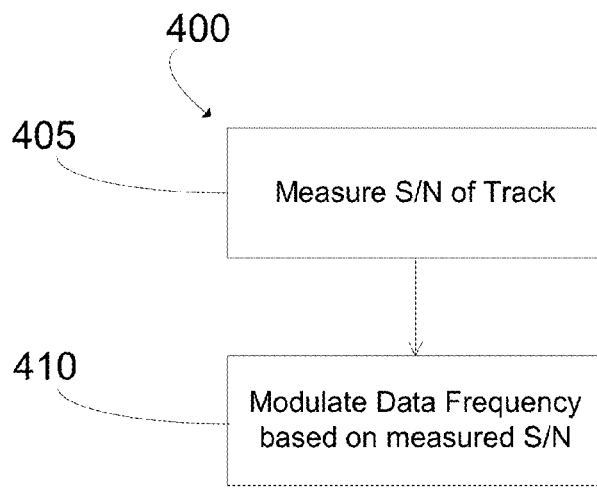
FIG. 4A depicts an illustrative flow chart describing disclosed illustrative methods.

FIG. 4A depicts an illustrative method disclosed herein. This illustrative method 400 can include a step 405 of measuring a S/N of at least one track. As discussed above, this step can be accomplished, for example, by measuring the bits in error of the track, the bit error ratio of the track, or any combination thereof. Other methods of measuring the S/N can also be utilized herein. The S/N of at least one portion of at least one track can be measured. In some embodiments, the S/N can be measured at numerous points, or a plurality of points around a track. In some embodiments, the S/N can be measured at least once in each sector of a track. Measurement of the S/N at least once in each sector of a track can also be referred to as measuring the S/N once around "OAR" a track. FIG. 3 is an example of S/N (e.g. BER) measurements once a sector around a track (e.g. OAR).

The next step in an illustrative method can be step 410, modulating a data frequency based on the measured S/N of the at least one track. This step includes changing the data frequency at which data is written to or read from a track based on the S/N measured. As discussed above, for example, at instances where the S/N measurement is higher (e.g., less noise), the data frequency can be increased and at instances where the S/N measurement is lower (e.g., more noise) the data frequency can be decreased.

Figure 4B:
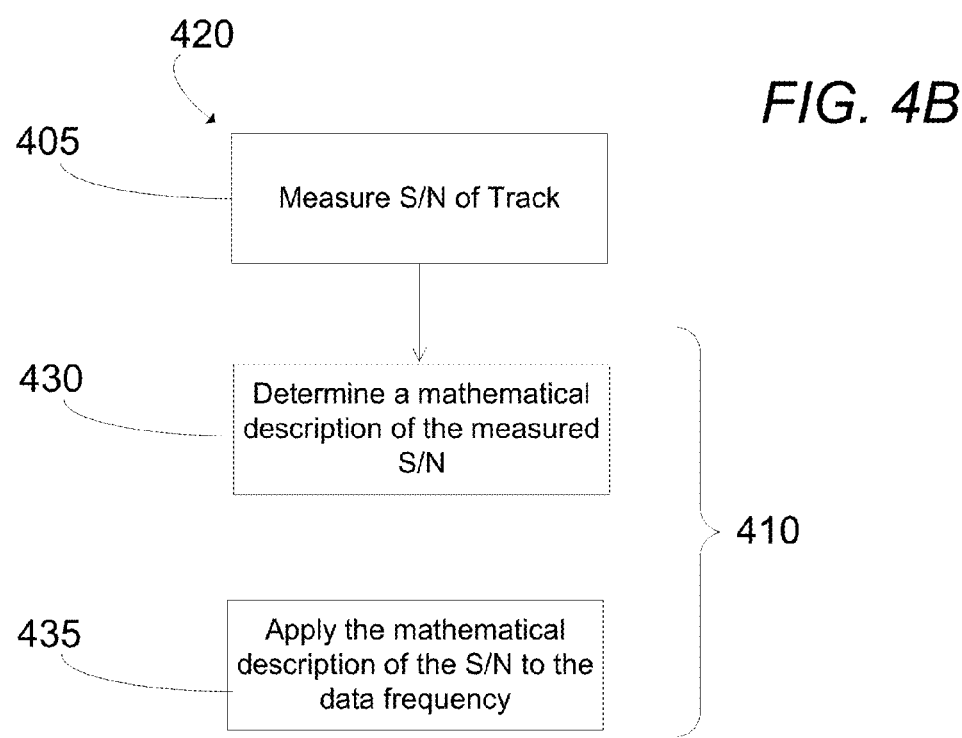
FIG. 4B depicts an illustrative flow chart describing disclosed illustrative methods that include optional steps.

In some embodiments, step 410, the step of modulating a data frequency based on the S/N measurement of the at least one track can include more than one step. FIG. 4B depicts an illustrative method where the step 410 of modulating a data frequency based on the S/N measurement includes both step 430 and step 435. Step 430, determining a mathematical description of the measured S/N can be accomplished as would be known to one of skill in the art. For example, the S/N data can be fit to a line, the line being described by an equation. That equation can then be utilized as the mathematical description of the S/N measurement. Step 435, applying the mathematical description of the S/N measurement to the data frequency can be accomplished by applying the mathematical description to a first data frequency (a data frequency that would have been utilized to read and write data on the magnetic storage disc absent the S/N measurement). For example, at instances where the S/N measurement is higher (e.g., less noise), the data frequency can be increased and at instances where the S/N measurement is lower (e.g., more noise) the data frequency can be decreased. The increases and decreases would be indicated by the equation that describes the S/N measurements.

Figure 5A:
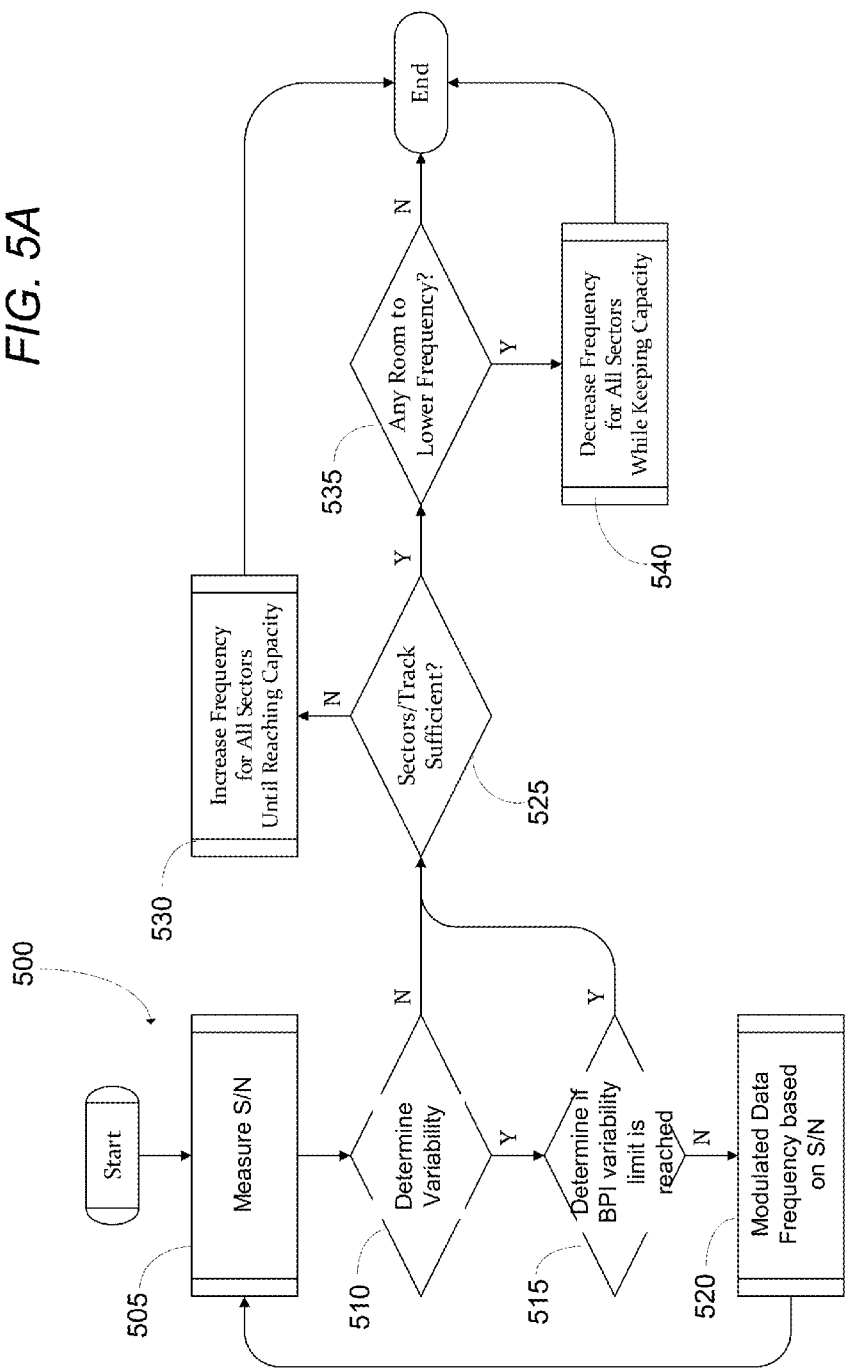
FIGS. 5A and 5B depict illustrative flow charts describing disclosed illustrative methods that include optional steps.

FIG. 5A depicts another illustrative method disclosed herein. The method 500 depicted by the flowchart in FIG. 5A starts with step 505, measuring the S/N. As discussed above, the S/N of at least a portion of a track can be measured by measuring the bit error rate or the bit error ratio, for example. The S/N (e.g., the bit error rate or the bit error ratio) can be measured at at least one point on a track. In some embodiments, the S/N can be measured once in each sector of a track. Once the S/N has been measured, the next step in the illustrative method 500 can include step 510 of determining the level of variation in the S/N. If the measured S/N does not include a significant amount of variability, modifying the data frequency to compensate for the variability will not provide sufficient benefit to make the task worthwhile. If however, the S/N does include some level of variability, then modification of the data frequency to compensate for it would be beneficial. The level of variability in the measured S/N where compensation in the data frequency becomes beneficial could be determined on or decided by one of skill in the art. The decision could be made by considering the time and/or efficiencies lost by the system if the system has to modify the data frequency, the benefits that could be obtained by modulating the data frequency, or any combination thereof. It should be noted that the level at which modulation is determined to be beneficial may also be affected by considering that the most time and processor intensive undertaking, measuring the S/N, has already been accomplished, therefore, the downside of proceeding further may be lessened. It should be noted that step 510, determining if the variability in the S/N is significant is an optional step and can be eliminated in some embodiments, so that once the S/N has been measured, the method automatically proceeds.

Another optional step, step 515, can include determining if the bits per inch (BPI) variability limit has been reached. Variability in the BPI is caused by variability in the data frequency. As the data frequency increases, the BPI increases as data is read from/written to the magnetic storage disc more often, e.g., closer together. A magnetic storage system may optionally include a limit on the BPI variability that is desirable. The BPI variability limit could be set based on a number of factors, including for example the measurement capability or the minimum required SNR. It should be noted that step 515, determining if the variability in BPI limit has been reached is an optional step and can be eliminated in some embodiments. If the BPI variability limit is considered and has not been met then a next step can be undertaken.

The next step, after either step 505, optional step 510 if the variability in S/N has been determined to be significant, optional step 515 if the variability in BPI limit has not been reached, or some combination thereof can include step 520, modulating the data frequency based on the S/N. It should also be noted that the measured S/N can be utilized to modulate the BPI, as BPI is directly related to data frequency. Therefore, in this disclosure, modulating the data frequency and modulating the BPI can be used interchangeably.

As discussed above, the data frequency (or BPI) is modulated based on the measured S/N (e.g. the bit error rate or the bit error ratio for example). This can be accomplished by, for example, obtaining a mathematical fit (e.g., an equation) for the measured S/N data and then applying that equation to the data frequency to modulate it.

The method 500 in FIG. 5A shows that steps 505, optional step 510, optional step 515 and step 520 can be repeated (arrow on left of flowchart). In some embodiments, these steps can be repeated on each track, at least one track in a zone, or one track in a zone, for example. The more tracks this method is repeated on, the more constant the S/N of the overall disc becomes because the data frequency is modulated to make up for the variability in the S/N of the magnetic storage disc.

The method 500 in FIG. 5A also includes additional optional steps. For example, if step 510 was carried out at some point (e.g., after S/N had been measured and BPI had been modulated, or before) and it was determined that the variability in the S/N was not significant; or if step 515 was carried out at some point (e.g., after S/N had been measured and BPI had been modulated, or before) and it was determined that the BPI variability limit was reached, then step 525 could be considered. Step 525 can include determining if the number of sectors/track is sufficient. This step can also indicate whether the magnetic storage disc is at a sufficient or desired capacity. The sufficient or desired capacity can be determined by the manufacturer (for example) and can be based, at least in part, on various considerations including for example a stated memory capacity of a magnetic storage system. If it is determined that the number of sectors/track is not sufficient, than the data frequency can be increased (see step 530) for all sectors (not dependent on the S/N measurement) until the desired or sufficient capacity (sectors/track) is met. If it is determined that the number of sectors/track is sufficient, then step 535, determining if there is any room to lower frequency, can be considered. This step is designed to consider whether the data frequency has been increased more than necessary based on the measured S/N. For example, if the desired capacity (sectors/track) has been exceeded, the data frequency could be lowered (step 535) while still maintaining the desired capacity (step 540).

Figure 5B:
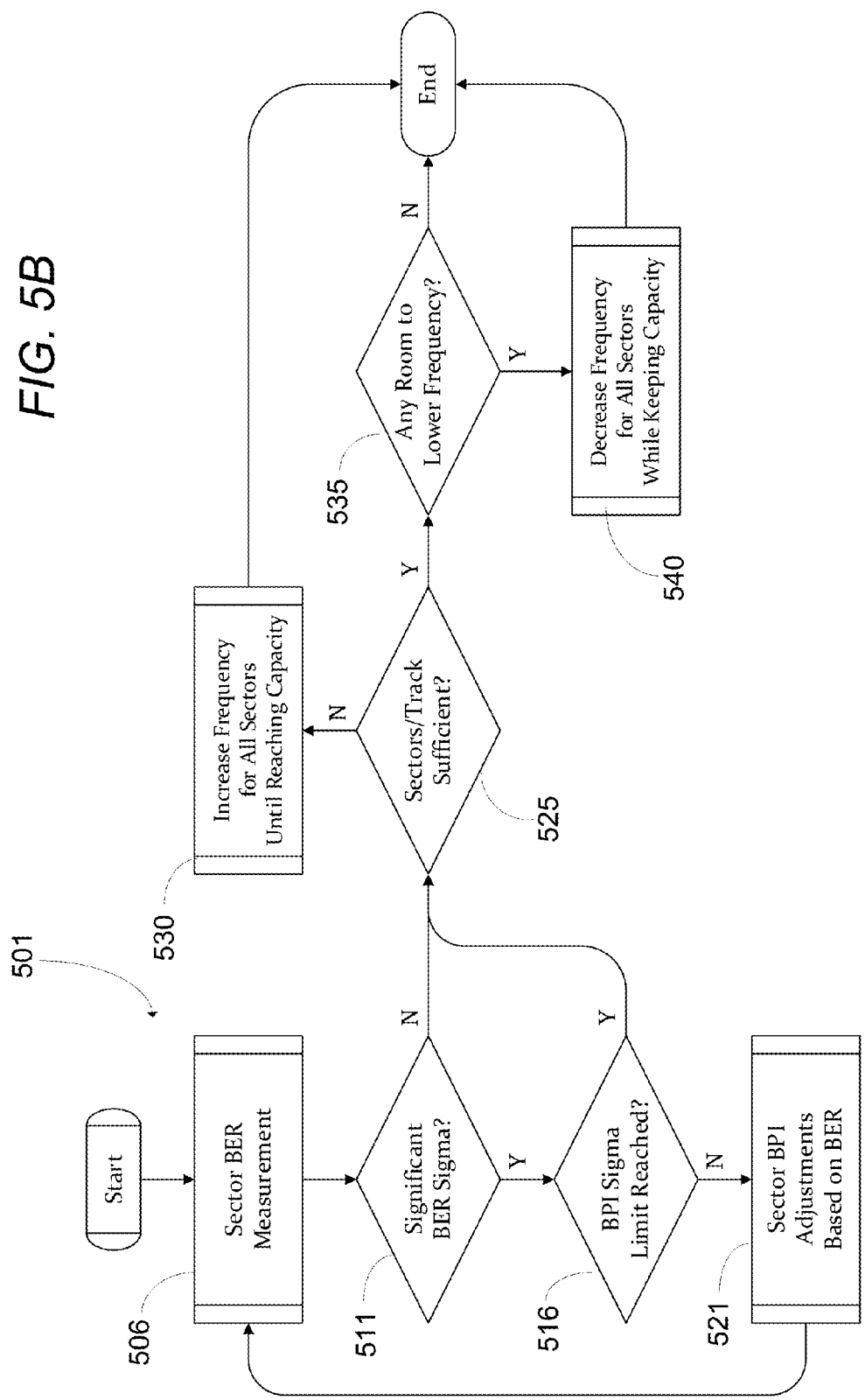

FIG. 5B depicts another illustrative method 501 that is similar to that depicted in FIG. 5A. The method 501 in FIG. 5B includes some of the same steps as the method 500 in FIG. 5A. The steps that are similar are numbered similarly. Specifically, the optional steps 525, 530, 535, and 540 in the method 501 are similar to that of method 500 (FIG. 5A). The discussion above with respect to steps 525, 530, 535, and 540 is equally applicable to those steps in method 501.

The method 501 in FIG. 5B includes a first step, step 506 of measuring the bit error rate or the bit error ratio (BER) of a track once per sector. Once the BER has been measured, an optional step 511 can be undertaken to determine if the measured BER has significant variability, or stated another way, is the BER sigma significant. If it is significant, then another optional step can be undertaken, optional step 516. If the BER sigma is not significant, then step 525 (discussed above with respect to method 500) can be undertaken. Optional step 516, determining if the limit of the variability in the BPI (e.g., the BPI sigma limit) is next. If the BPI sigma limit has not been met, then step 521 can be undertaken. Step 521 includes adjusting the sector BPI based on the measured BER (from step 506).

Similar to method 500, the steps 506, optional 511, optional 516 and 521 can be repeated on each track (e.g., each sector on each track can have the BER measured). In some embodiments the steps 506, optional 511, optional 516 and 521 can be repeated on at least one track in each zone of the magnetic storage disc. In some embodiments, the steps 506, optional 511, optional 516 and 521 can be repeated enough, or enough measurements of BER can be obtained to at least substantially eliminate time dependent noise, to be left with repeatable variation, or some combination thereof.

In some embodiments, disclosed methods may significantly reduce BER distribution sigma of a magnetic storage disc or magnetic storage system, for example. In some embodiments, disclosed methods may make track based BER measurement results far more meaningful. Track based BER is a typical metric for manufacturing process specifications and disclosed methods may make the specifications better able to correlate to drive reliability.

Also disclosed herein are data storage devices or data storage systems that can utilize disclosed methods. In some embodiments, magnetic storage disc drives or disc drives are disclosed that utilized disclosed methods. Referring to FIGS. 1 and 2, an illustrative disc drive can include at least one magnetic storage disc. The at least one magnetic storage disc can include a plurality of zones, each zone including a plurality of tracks and each track including a plurality of sectors (see FIG. 2 and associated description). The disc drive or system can also include at least one data transducer (e.g., a magnetic data transducer) associated with the magnetic storage disc (see FIG. 1). The disc drive or system also includes a write channel. The write channel is adapted and configured to write data to the magnetic storage disc. The write channel can include the electronics (e.g., functional circuit) and the controller to record data on the magnetic storage disc via the associated magnetic data transducer. The disc drive or system also includes a read channel. The read channel is adapted and configured to read data from the magnetic storage disc. The read channel can include the electronics (e.g., functional circuit) and the controller to read data from the magnetic storage disc via the associated magnetic data transducer.

Both the read channel and the write channel in disclosed systems can read data from and write data to the storage disc at a variable data frequency. The variable data frequency can be determined as discussed above, in short by measuring the S/N of at least some portion of a track and modulating the data frequency (to create a variable data frequency) to compensate for the measured S/N. The variable data frequency can change along a single track. In some embodiments, the variable data frequency can be described as differing for different sectors within each track or within each zone of the storage disc.

In some embodiments, the method can be carried out on a magnetic storage disc before the magnetic storage disc is provided to a user. Stated another way, in some embodiments, the method can be carried out once (albeit with numerous iterations through the method, e.g. with numerous measurements of S/N) for each magnetic storage disc and then that information can be utilized every time that data is read from or written to each magnetic storage disc. This type of usage could be referred to as pre-usage configuring. In some embodiments, the method can be carried out on a magnetic storage disc before the magnetic storage disc is provided to a user, after the magnetic storage disc has been provided to a user, or any combination thereof. This type of usage could be referred to as pre- and post-usage configuring.

Methods and devices disclosed herein may offer magnetic storage systems that provide less variability in the S/N ratio which may translate into higher reliability.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of methods of modulating data frequency are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A method for determining a variable data frequency for recording data on a zone of a magnetic storage disc, each zone comprising a plurality of tracks and each track comprising a plurality of sectors, the method comprising:
   measuring a signal to noise ratio (S/N) around at least a first track in a first zone; and
   modulating a data frequency based on the measured S/N around the first track.

2. The method according to claim 1, wherein the S/N can be obtained by measuring bits in error (BER).

3. The method according to claim 2, wherein there are enough BER measurements to eliminate time dependent noise.

4. The method according to claim 2, wherein the BER is measured a plurality of times around the track.

5. The method according to claim 4, wherein the BER is measured at least once per sector.

6. The method according to claim 4, wherein the BER values versus sector are mathematically fit in order to determine how S/N changes around the track.

7. The method according to claim 6, wherein the mathematical fit can be utilized to determine how the S/N changes around the plurality of tracks in the zone.

8. The method according to claim 1 further comprising determining a variable data frequency for each of the zones in the magnetic storage disc by obtaining at least one measurement of the S/N in each of the zones and determining how the S/N changes across each of the zones.

9. The method according to claim 1, wherein the step of determining the variable data frequency for the zone further comprises determining whether an increase in the data frequency would result in a bits per inch (BPI) capacity higher than a predetermined BPI capacity.

10. The method according to claim 9, wherein the variable data frequency can be lowered if the resultant BPI capacity is higher than the predetermined BPI capacity.

11. A disc drive comprising:
at least one magnetic storage disc, each of the at least one magnetic storage discs comprising a plurality of zones, each zone comprising a plurality of tracks, and each track comprising a plurality of sectors;
at least one associated magnetic data transducer;
a write channel adapted to write data to the magnetic storage disc at a variable data frequency, which may differ for different sectors within each zone of the magnetic storage disc; and
a read channel adapted to read data from the magnetic storage disc at a variable data frequency, which may differ for different sectors within each zone of the magnetic storage disc
the variable data frequency being dependent on a signal to noise ratio (S/N) of at least some portion of the magnetic storage disc.

12. The disc drive according to claim 11, wherein each independent zone of the magnetic storage disc has a different variable data frequency.

13. The disc drive according to claim 12, wherein the variable data frequency of each sector in the zone is dependent on a plurality of BER values within the zone.

14. The disc drive according to claim 12, wherein the variable data frequency of each sector of each independent zone is dependent on a mathematical fit of the plurality of BER values from within that independent zone.

15. A method for recording data on and writing data to a zone of a magnetic storage disc, each zone comprising a plurality of tracks and each track comprising a plurality of sectors, the method comprising:
measuring a signal to noise ratio (S/N) in at least each sector around at least a first track in a first zone;
determining how the S/N changes around the tracks in the first zone by mathematically fitting the measured S/N to an equation; and
recording data on or writing data to the zone of the magnetic storage disc by modulating a data frequency for recording data or writing data based on the equation.

16. The method according to claim 15, wherein the S/N can be obtained by measuring bits in error (BER).

17. The method according to claim 15 further comprising determining whether an increase in the data frequency would result in a bits per inch (BPI) capacity higher than a predetermined BPI capacity.

18. The method according to claim 17, wherein the variable data frequency can be lowered if the resultant BPI capacity is higher than the predetermined BPI capacity.

19. The method according to claim 1, wherein modulating the data frequency comprises modulating the data frequency for reading or writing around the first track.

20. The method according to claim 1, wherein the data frequency is not constant around the first track.

* * * * *